United States Patent
Uchiyama

(10) Patent No.: US 12,176,818 B2
(45) Date of Patent: Dec. 24, 2024

(54) POWER SOURCE DEVICE AND IMAGE FORMING APPARATUS

(71) Applicant: CANON KABUSHIKI KAISHA, Tokyo (JP)

(72) Inventor: Nobuyuki Uchiyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 17/971,747

(22) Filed: Oct. 24, 2022

(65) Prior Publication Data

US 2023/0135362 A1    May 4, 2023

(30) Foreign Application Priority Data

Nov. 2, 2021 (JP) ................................ 2021-179726

(51) Int. Cl.
*H02M 3/335* (2006.01)
*H02M 3/00* (2006.01)

(52) U.S. Cl.
CPC ....... *H02M 3/33592* (2013.01); *H02M 3/015* (2021.05)

(58) Field of Classification Search
CPC .... H02M 3/33569; H02M 1/08; H02M 1/346; H02M 3/33592; H02M 3/015;
(Continued)

(56) References Cited

U.S. PATENT DOCUMENTS 4,675,796 A * 6/1987 Gautherin ............. H02M 3/335
363/20
5,379,206 A * 1/1995 Davidson ........... H03K 17/0814
363/55

(Continued)

FOREIGN PATENT DOCUMENTS

JP    H03-288367 A    12/1991
JP    2004-312949 A    11/2004
(Continued)

OTHER PUBLICATIONS

Mar. 10, 2023 Extended Search Report in European Patent Application No. 22 202 389.7.

(Continued)

*Primary Examiner* — Yusef A Ahmed
(74) *Attorney, Agent, or Firm* — Venable LLP

(57) ABSTRACT

A power source device includes a transformer, a rectifying circuit, a series circuit, a switching element and a capacitor. The transformer includes first and second primary windings and a secondary winding. The rectifying circuit includes first and second output terminals and fully rectifies an AC voltage. The series circuit in which an inductor and a rectifying element are connected in series and connected between the first output terminal and a connecting point where one end of the first primary winding and one end of the second primary terminal are connected. The switching element is connected between the other end of the second primary winding and the second output terminal and switched between an on state and an off state. The capacitor is connected between the other end of the first primary winding and the second output terminal. An inductance of the inductor is set so that a voltage of the capacitor is higher than an output voltage of the rectifying circuit.

12 Claims, 8 Drawing Sheets

(58) Field of Classification Search
CPC ...... H02M 1/4258; H02M 7/043; H02M 7/05; H02M 1/007; H02M 1/0029; H02M 1/0054; H02M 1/44; H02M 3/33523; H02M 7/06; G03G 15/5004; G03G 15/80; G03G 15/0266; Y02B 70/10; B41J 29/38; H03K 17/163

See application file for complete search history.

(56) References Cited

U.S. PATENT DOCUMENTS

| | | | | |
|---|---|---|---|---|
| 5,598,324 | A * | 1/1997 | Imamura | H02M 3/335 363/21.02 |
| 5,883,795 | A * | 3/1999 | Farrington | H02M 3/33538 363/21.04 |
| 6,005,780 | A * | 12/1999 | Hua | H02M 1/4258 363/20 |
| 6,038,146 | A * | 3/2000 | Luo | H02M 1/4258 363/21.16 |
| 6,061,253 | A * | 5/2000 | Igarashi | H02M 1/34 363/19 |
| 6,088,242 | A * | 7/2000 | Koegel | H02M 1/4258 363/20 |
| 6,115,271 | A * | 9/2000 | Mo | H02M 1/34 363/56.11 |
| 6,191,965 | B1 * | 2/2001 | Matsumoto | H02M 3/33592 363/127 |
| 6,314,002 | B1 * | 11/2001 | Qian | H02M 3/33538 363/21.04 |
| 6,421,255 | B1 * | 7/2002 | Frebel | H02M 3/33538 363/21.04 |
| 6,473,318 | B1 * | 10/2002 | Qian | H02M 3/33569 363/21.16 |
| 6,496,389 | B1 * | 12/2002 | Yasumura | H02M 1/4258 363/21.04 |
| 7,630,219 | B2 * | 12/2009 | Lee | H02M 1/34 363/21.16 |
| 8,880,911 | B2 | 11/2014 | Karino | |
| 9,106,148 | B2 | 8/2015 | Uchiyama | |
| 9,304,478 | B2 | 4/2016 | Hayasaki | |
| 9,362,831 | B2 * | 6/2016 | Skinner | H02M 3/156 |
| 9,787,205 | B2 | 10/2017 | Kobayashi | |
| 10,547,244 | B2 * | 1/2020 | Odate | H02M 3/33592 |
| 11,165,351 | B1 * | 11/2021 | Yau | H02M 1/342 |
| 11,314,191 | B2 | 4/2022 | Uchiyama | |
| 2002/0114176 | A1 * | 8/2002 | Morita | H02M 1/14 363/95 |
| 2002/0154522 | A1 * | 10/2002 | Morita | H02M 1/4258 363/21.12 |
| 2003/0002301 | A1 * | 1/2003 | Yamagishi | H02M 3/33576 363/21.12 |
| 2003/0043600 | A1 * | 3/2003 | Morita | H02M 1/34 363/21.01 |
| 2003/0043602 | A1 * | 3/2003 | Morita | H02M 1/4258 363/24 |
| 2003/0142514 | A1 * | 7/2003 | Hosotani | H02M 3/3385 363/21.02 |
| 2003/0142521 | A1 * | 7/2003 | Hosotani | H02M 1/40 363/100 |
| 2004/0208021 | A1 * | 10/2004 | Takada | H02M 1/4258 363/16 |
| 2005/0117371 | A1 * | 6/2005 | Imamura | H02M 1/4258 363/20 |
| 2005/0243492 | A1 * | 11/2005 | Imamura | H02M 1/4258 361/118 |
| 2006/0176715 | A1 * | 8/2006 | Hosotani | H02M 3/33569 363/21.01 |
| 2006/0187688 | A1 * | 8/2006 | Tsuruya | H01F 27/38 363/56.12 |
| 2010/0247126 | A1 * | 9/2010 | Naganawa | G03G 15/0266 399/50 |
| 2011/0150521 | A1 * | 6/2011 | Uchiyama | G03G 15/80 399/88 |
| 2011/0205770 | A1 * | 8/2011 | Isogai | H02M 1/32 363/78 |
| 2012/0301172 | A1 * | 11/2012 | Odate | G03G 15/80 399/88 |
| 2013/0064566 | A1 * | 3/2013 | Kojima | H02M 3/33523 363/21.01 |
| 2013/0236206 | A1 * | 9/2013 | Shoji | H02M 3/33523 399/88 |
| 2013/0329469 | A1 * | 12/2013 | Kubota | H02M 3/33507 363/21.16 |
| 2014/0119065 | A1 * | 5/2014 | Sugahara | H02M 3/33523 363/21.13 |
| 2016/0359419 | A1 * | 12/2016 | Lin | H02M 3/33592 |
| 2018/0212508 | A1 * | 7/2018 | Kobayashi | G03G 15/5004 |
| 2018/0316269 | A1 * | 11/2018 | Shimura | H02M 3/33571 |
| 2019/0074761 | A1 * | 3/2019 | Matsuda | H02M 1/32 |
| 2019/0207530 | A1 * | 7/2019 | Hirose | H02M 1/36 |
| 2020/0112263 | A1 * | 4/2020 | Hayasaki | H02M 3/33592 |
| 2021/0124300 | A1 * | 4/2021 | Uchiyama | H02M 5/12 |
| 2022/0352825 | A1 * | 11/2022 | Uchiyama | H02M 3/33569 |
| 2022/0368806 | A1 * | 11/2022 | Hirano | H02M 1/346 |

FOREIGN PATENT DOCUMENTS

| | | |
|---|---|---|
| JP | 2005-045966 A | 2/2005 |
| JP | 2021-072768 A | 5/2021 |
| JP | 2021-132424 A | 9/2021 |

OTHER PUBLICATIONS

Jan. 29, 2024 European Official Action in European Patent Appln. No. 22202389.7.

* cited by examiner

POWER SOURCE DEVICE AND IMAGE FORMING APPARATUS

FIELD OF THE INVENTION AND RELATED ART

The present invention relates to a power source device and an image forming apparatus which is provided with a power source.

A switching power source which is used for a general electronic device often use a capacitor input type method, in which a smoothing capacitor for smoothing DC voltage is arranged at a rear stage of a diode bridge which fully rectifies an AC voltage which is input from an AC power source. A capacitor input type switching power source is characterized by a low power factor since an input current flows into a transformer when an output voltage of a diode bridge exceeds a smoothing capacitor voltage. Therefore, as a technique to increase the power factor, a switching power source is invented in which a current waveform of an input current is a shape whose peak portion is suppressed rather than a shape of a sine wave. For example, in Japanese Patent 03288367, a technique is proposed to improve a power factor by connecting an electronic device in which the switching power source is mounted and an electronic device in which a switching power source of a capacitor input type is mounted to a same AC power source to make a composed waveform of an input current approximated to a sinusoidal wave shape.

However, the circuit configuration of the switching power source which is described above is based on a power factor correction circuit of a general step-up type, and is a circuit configuration which applies a transformer which outputs a relatively high voltage in which a primary side and a secondary side are not insulated. Thus, the circuit configuration is not suitable for a switching power source which uses a transformer in which the primary side and the secondary side are insulated and which outputs low voltage from several volts to several tens of volts.

SUMMARY OF THE INVENTION

In response to such situation, an object of the present invention is to improve power factor of a switching power source in which a primary side and a secondary side are insulated from each other.

In order to solve the problems which are described above, the present invention is provided with following configurations.

According to an aspect of the present invention, there is provided a power source device comprising, a transformer including a first primary winding and a second primary winding, and a secondary winding, and of which a primary side and a secondary side are insulated from each other, a rectifying circuit including a first output terminal and a second output terminal, and configured to fully rectify an AC voltage, a first series circuit in which an inductor and a first rectifying element are connected in series, the first series circuit being connected between the first output terminal and a first connecting point where one end of the first primary winding and one end of the second primary terminal are connected, a switching element connected between the other end of the second primary winding and the second output terminal, and configured to be switched between an on state and an off state and a first capacitor connected between the other end of the first primary winding and the second output terminal, wherein an inductance of the inductor is set so that a voltage of the first capacitor is higher than an output voltage of the rectifying circuit, and a number of turns of the first primary winding is larger than the number of turns of the second primary winding.

According to another aspect of the present invention, there is provided an image forming apparatus comprising, an image forming portion configured to form an image on a recording material and a power source device configured to supply power to the image forming portion, wherein the power source device including a transformer including a first primary winding and a second primary winding, and a secondary winding, and of which a primary side and a secondary side are insulated from each other, a rectifying circuit including a first output terminal and a second output terminal, and configured to fully rectify an AC voltage, a first series circuit in which an inductor and a first rectifying element are connected in series, the first series circuit being connected between the first output terminal and a first connecting point where one end of the first primary winding and one end of the second primary terminal are connected, a switching element connected between the other end of the second primary winding and the second output terminal, and configured to be switched between an on state and an off state and a first capacitor connected between the other end of the first primary winding and the second output terminal, wherein an inductance of the inductor is set so that a voltage of the first capacitor is higher than an output voltage of the rectifying circuit, and a number of turns of the first primary winding is larger than the number of turns of the second primary winding.

According to a further aspect of the present invention, there is provided an image forming system comprising, an image forming apparatus configured to form an image on a recording material, and a processing apparatus connected to the image forming apparatus and configured to supply the recoding material to the image forming apparatus or to perform post processing to the recording material on which the image is formed by the image forming apparatus, wherein the image forming apparatus is provided with a first power source and the processing apparatus is provided with a second power source, wherein the first power source includes a first transformer of which a primary side and a secondary side are insulated from each other, a first rectifying circuit including a first output terminal and a second output terminal, and configured to fully rectify an AC voltage, a first switching element connected between one end of a primary winding of the first transformer and the second output terminal, and configured to be switched between an on state and an off state, and a first capacitor connected between the first output terminal and the second output terminal, wherein the second power source includes a second transformer including a first primary winding and a second primary winding and a secondary winding, and of which a primary side and a secondary side are insulated from each other, a second rectifying circuit including a third output terminal and a fourth output terminal, and configured to fully rectify an AC voltage, a first series circuit in which an inductor and a first rectifying element are connected in series, the first series circuit being connected between the third output terminal and a first connecting point where one end of the first primary winding and one end of the second primary terminal are connected, a second switching element connected between one end of the second primary winding and the fourth output terminal, and configured to be switched between an on state and an off state, and a second capacitor connected between the first primary winding and the second output terminal, wherein an inductance of the inductor is set so that a voltage of the second capacitor is higher than an output voltage of the second rectifying circuit.

Further features of the present invention will become apparent from the following description of exemplary embodiments with reference to the attached drawings.

Figure 3A:
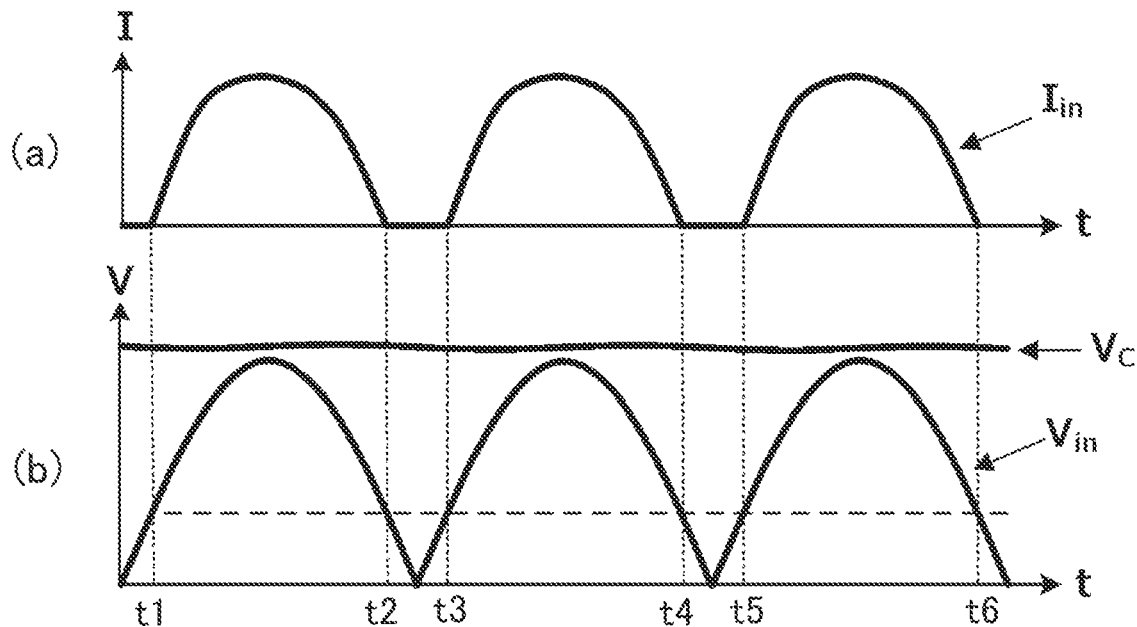

Part (a) and part (b) of FIG. 3A are graphs showing a current waveform and a voltage waveform according to the first embodiment.

Figure 3B:
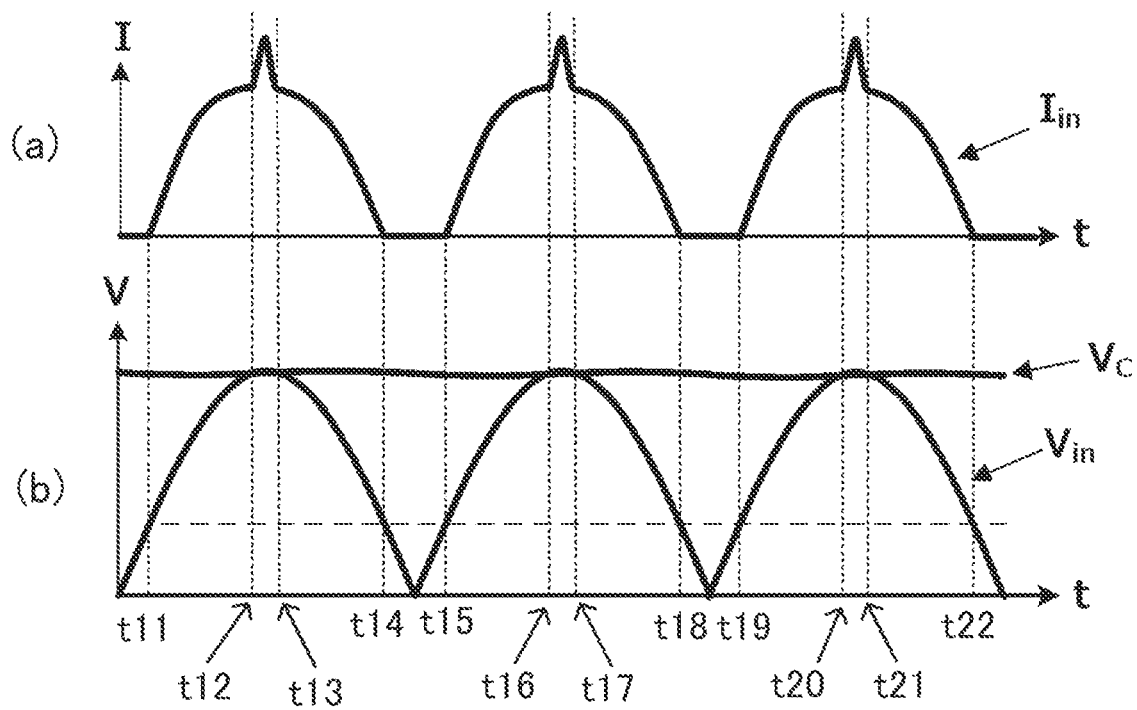

Part (a) and part (b) of FIG. 3B are graphs showing a current waveform and a voltage waveform according to the first embodiment.

Figure 4:
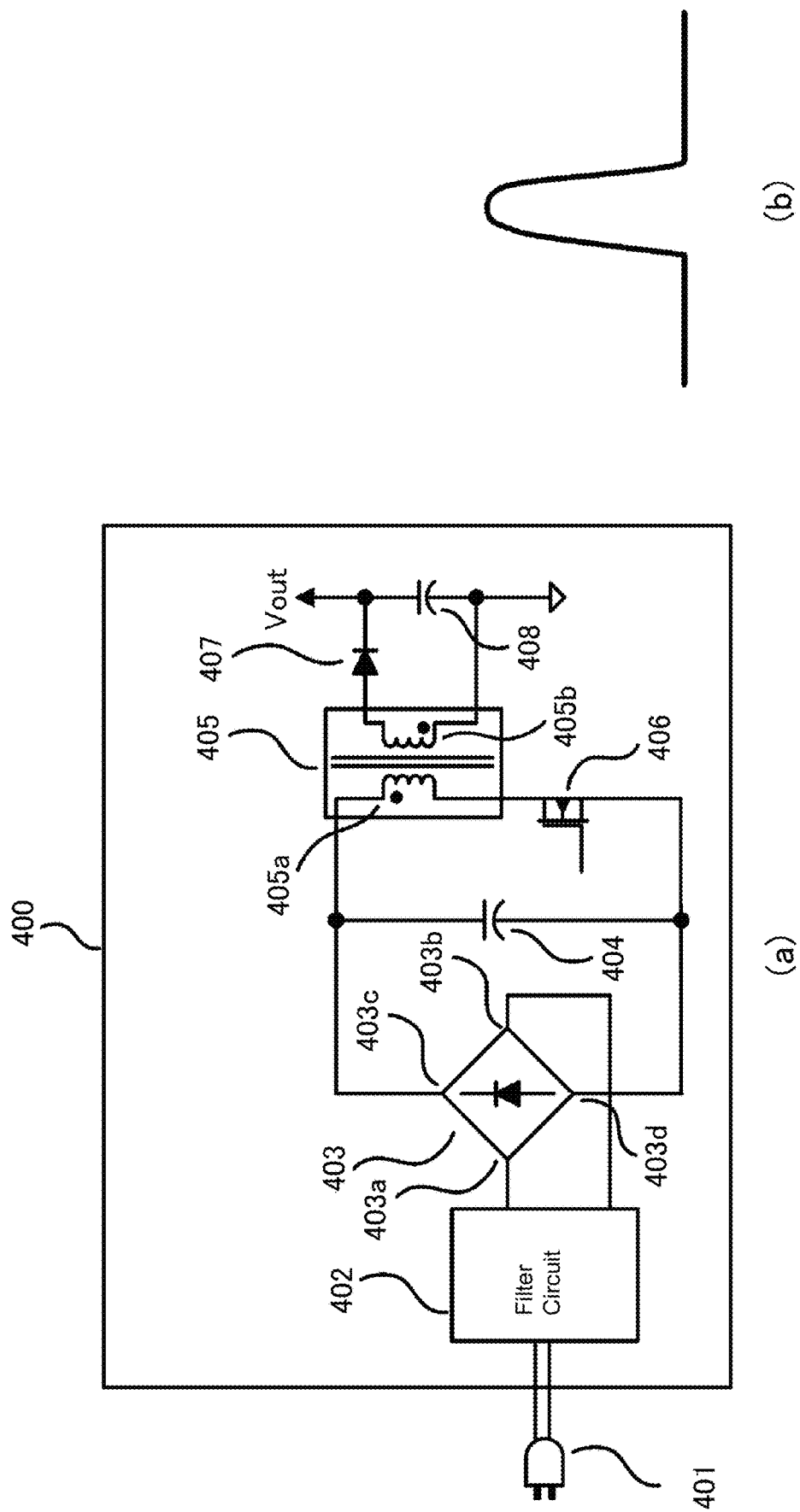

Part (a) and part (b) of FIG. 4 are a circuit diagram of a switching power source of a capacitor input type and a diagram illustrating a current waveform according to from the first through the third embodiments.

Figure 5:
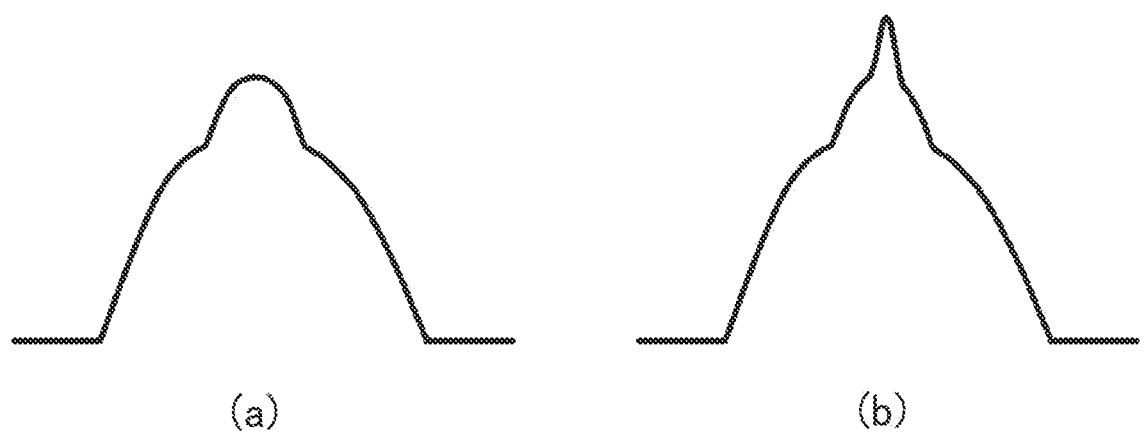

Part (a) and part (b) of FIG. 5 are drawings comparing input current waveforms according to the first embodiment.

Figure 6:
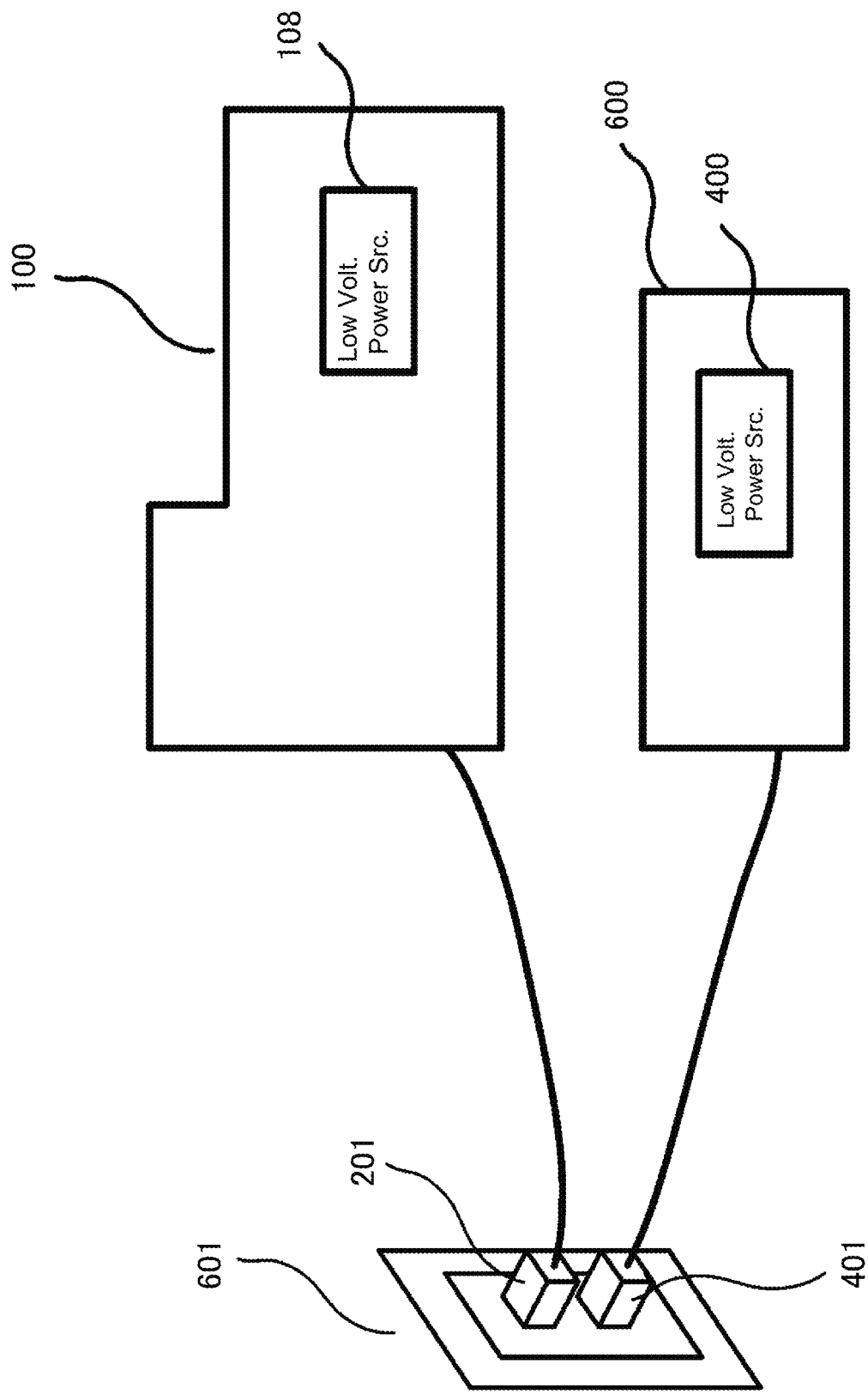

FIG. 6 is a drawing illustrating a usage pattern of an electronic device according to the first embodiment.

Figure 7:
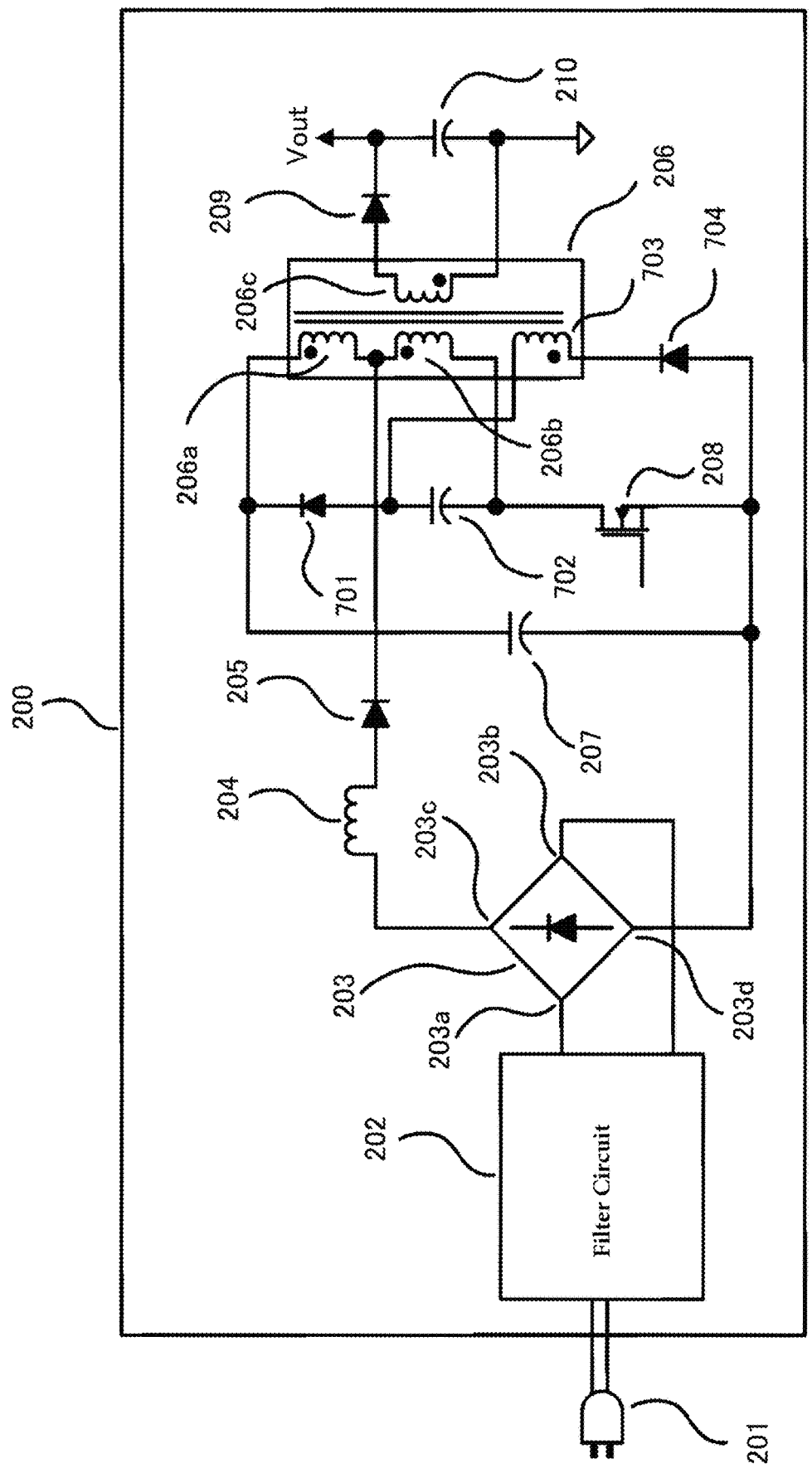

FIG. 7 is a circuit diagram of the switching power source according to the second embodiment.

Figure 8:
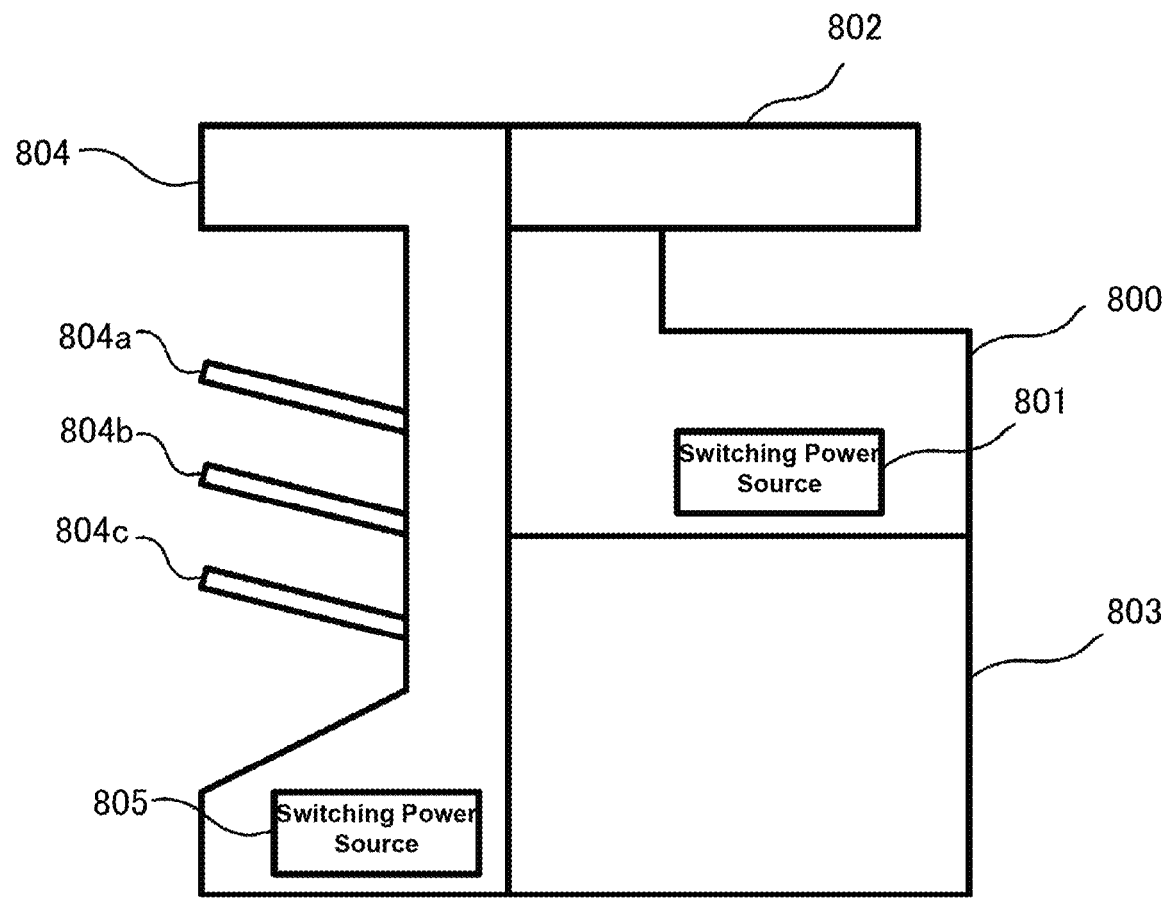

FIG. 8 is a schematic diagram of a configuration of an image forming apparatus according to the third embodiment.

DESCRIPTION OF THE EMBODIMENTS

In the following, embodiments of the present invention will be specifically described with reference to Figures.

First Embodiment

[Configuration of Image Forming Apparatus]

Figure 1:
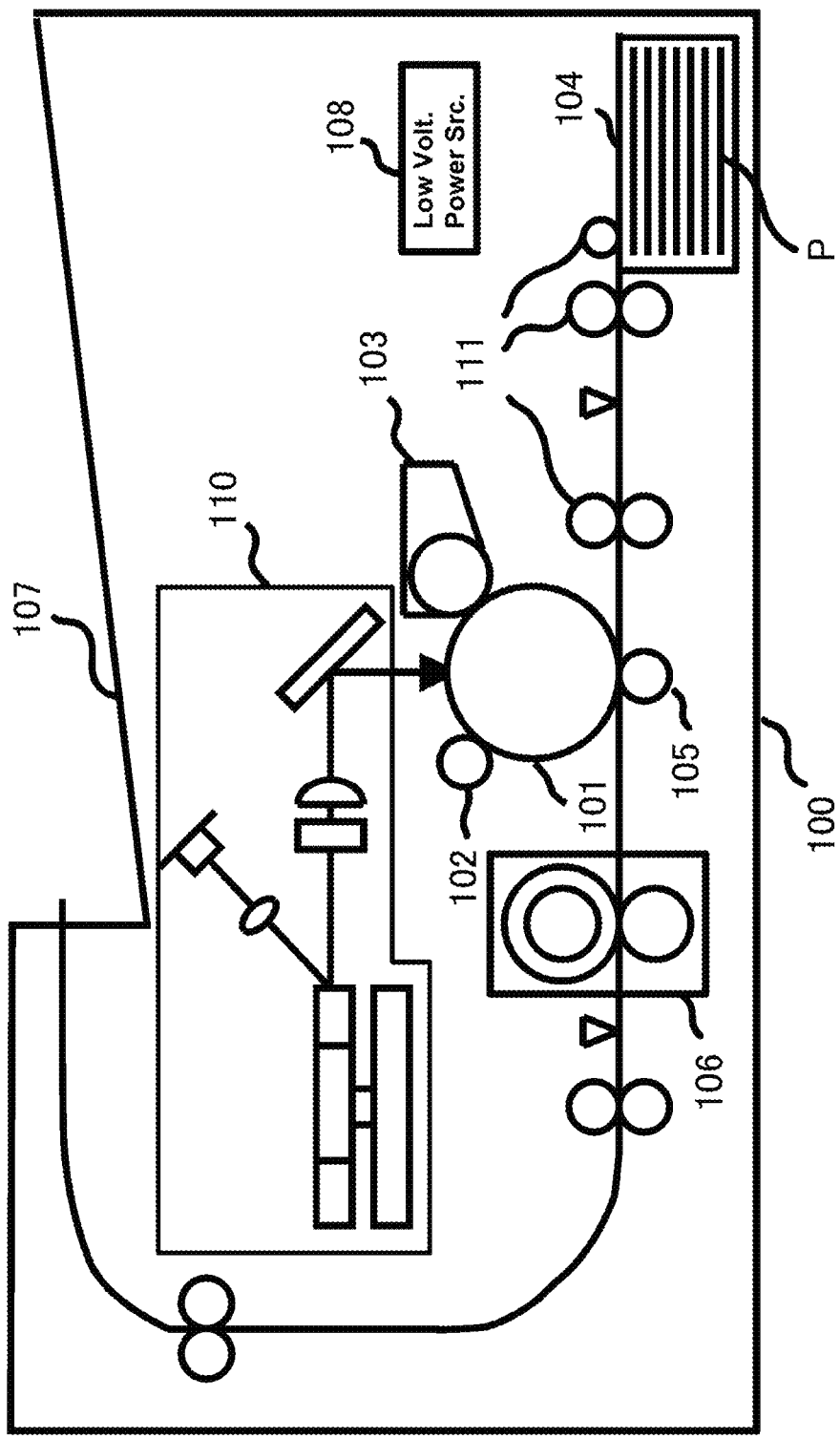
FIG. 1 is a schematic sectional view illustrating a configuration of an image forming apparatus according to a first embodiment and a second embodiment.

In the first embodiment, a case that a power source device according to the present invention is applied to an image forming apparatus will be described with reference to FIGS. 1 through 6. FIG. 1 is a sectional view showing a schematic configure of a laser beam printer as an example of an image forming apparatus. A laser beam printer 100 (hereinafter referred to as a "printer 100") is provided with a photosensitive drum 101 on which an electrostatic latent image is formed, a charging portion 102 which uniformly charges the photosensitive drum 101, and a developing portion 103 which develops the electrostatic latent image which is formed on the photosensitive drum 101 and form a toner image. Further, the printer 100 is provided with an exposure device 110 which emits a laser light onto the photosensitive drum 101 and form the electrostatic latent image on a surface of the photosensitive drum 101. In the printer 100, the toner image which is formed on the photosensitive drum 101 is transferred to a sheet P as a recording material which is fed from a cassette 104 by a roller 111, etc. with a transfer portion 105. The sheet P onto which the toner image is transferred is conveyed to a fixing device 106, the toner image is fixed on the sheet P in the fixing device 106, the sheet P on which the toner image is fixed is discharged to a tray 107. The photosensitive drum 101, the charging portion 102, the developing portion 103, and the transfer portion 105 are an image forming portion. Further, the printer 100 is provided with a low voltage power source device 108 which is a power source device, and the low voltage power source device 108 supplies power to a driving portion such as a motor and a control portion (not shown) which controls an image forming operation by the image forming portion and conveying operation of the sheet P.

[Configuration of Switching Power Source]

Figure 2:
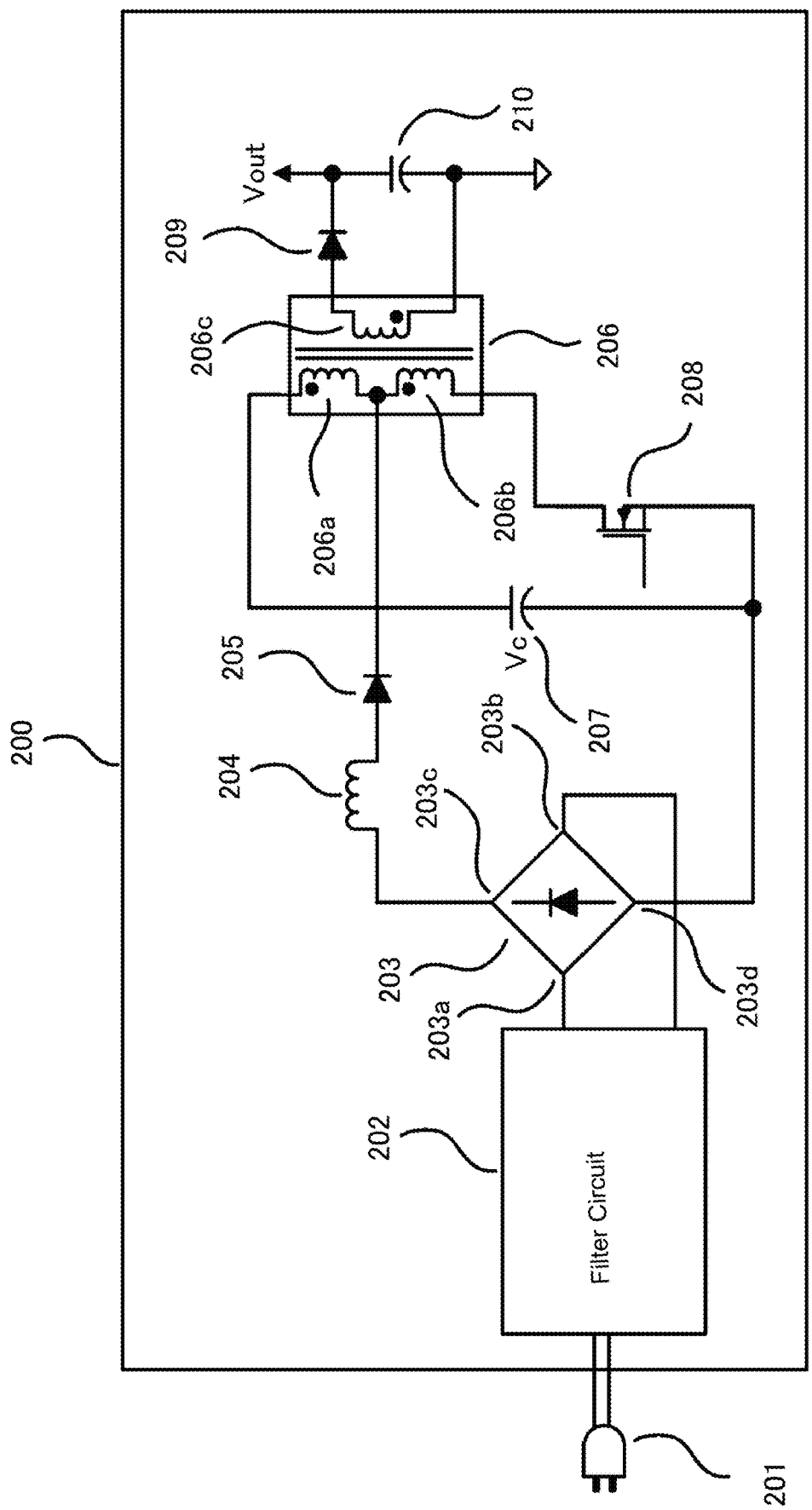
FIG. 2 is a circuit diagram of a switching power source according to the first embodiment.

FIG. 2 is a circuit diagram showing a circuit configuration of a switching power source 200 in the embodiment, in which the printer 100 in FIG. 1 is provided as the low voltage power source device 108. In FIG. 2, when an AC plug 201 is connected to an outlet, AC voltage is input from a commercial AC power source (not shown) to the switching power source 200. The input AC voltage is input to a diode bridge 203 via a filter circuit 202. The diode bridge 203, which is a rectifier circuit, includes terminals 203a and 203b on an input side and terminals 203c (a first output terminal) and 203d (a second output terminal) on an output side. The diode bridge 203 fully rectifies the AC voltage which is input from the terminals 203a and 203b on the input side, and outputs to the terminals 203c and 203d on the output side. On the other hand, in a case that an external load, to which power of the switching power source 200 is supplied, is substantially constant and an output voltage Vout is almost stable, a charging voltage Vc, which is charged to an electrolytic capacitor 207 which is a smoothing means, is almost constant, although the charging voltage Vc includes some ripple voltage depending on a capacity of the electrolytic capacitor. Incidentally, since the switching power source 200 includes a power factor correction circuit, the electrolytic capacitor 207 is configured on a downstream side of a primary winding of a transformer 206.

In FIG. 2, the terminal 203c on the output side of the diode bridge 203 is connected to one end of an inductor 204. The other end of the inductor 204 is connected to an anode terminal of a diode 205 (a first rectifier element), and a cathode terminal of the diode 205 is connected to a primary winding 206a (a first primary winding) and a primary winding 206b (a second primary winding) of the transformer 206. In this way, the inductor 204 and the diode 205 are connected in series and configures a series circuit.

The transformer 206 is an isolation transformer for converting energy of a primary side to a secondary side and includes the primary windings 206a and 206b, and a secondary winding 206c. In the transformer 206, a polarity of the primary windings 206a and 206b is different from that of the secondary winding 206c. The primary winding 206a of the transformer 206 and the primary winding 206b are connected in series. One end of the primary winding 206a is connected to a positive side of the electrolytic capacitor 207 (a first capacitor), and the other end of the primary winding 206a is connected to one end of the primary winding 206b and a cathode terminal of the diode 205. The other end of the primary winding 206b is connected to a drain terminal of a field effect transistor (hereinafter referred to as FET) which is a switching element. On the other hand, a source terminal of the FET 208 is connected to a negative side of the electrolytic capacitor 207 and the terminal 203d on an output side of the diode bridge 203. That is, the FET 208 is connected to the primary winding 206b of the transformer 206 in series. Further, a gate terminal of the FET 208 is connected to a control IC (not shown), and the FET 208 is set to ON state or OFF state according to a signal which is input to the gate terminal from the control IC. With the connection configuration which is described above, the electrolytic capacitor 207 is connected in parallel to the primary winding 206a and primary winding 206b of the transformer 206 which are connected in series.

Further, one end of the secondary winding 206c of the transformer 206 is connected to an anode terminal of a diode 209, and the cathode terminal of the diode 209 is connected to a positive side of an electrolytic capacitor 210. The positive side of the electrolytic capacitor 210 is connected to the cathode terminal of the diode 209 and the negative side of the electrolytic capacitor 210 is connected to the other end of the secondary winding 206c. A charge voltage of the electrolytic capacitor 210 is output to the external load which is connected to the switching power source 200 as the output voltage Vout of the switching power source 200.

When the FET 208 becomes a conductive state by an application of a gate voltage from the control IC (not shown) to a gate terminal of the FET 208, a charge voltage of the electrolytic capacitor 207 is divided by the primary winding 206a and the primary winding 206b of the transformer 206. When an output voltage of the diode bridge 203 is higher than the divided voltage, an input current to the transformer 206 flows to the inductor 204 and the diode 205.

Here, by increasing the number of turns of the primary winding 206a over the number of turns of the primary winding 206b, a voltage value which is divided by the primary winding 206a and the primary winding 206b is decreased, and an input current flows from an output voltage of the diode bridge 203 which is a lower voltage. Further, while the voltage value which is divided by the primary windings 206a and 206b is almost constant voltage, since the output voltage of the diode bridge 203 varies sinusoidally in terms of time, the waveform of the input current also varies substantially sinusoidally. Thus, the switching power source 200 is possible to obtain a power source characteristic with a high power factor.

On the other hand, during a period when the gate voltage is not supplied from the control IC (not shown) to the gate terminal of the FET 208, power (energy) which is stored in the primary side of the transformer 206 is transmitted to the secondary side. An operation of the switching power source 200 is similar to an operation of a flyback power source, as power is supplied to the secondary side of the transformer 206 when the FET 208 is turned off. And it is possible to set the output voltage Vout arbitrarily according to a turn ratio of the primary winding and the secondary winding of the transformer 206, and output from a few volts.

[A Relationship Between an Output Voltage of a Diode Bridge and an Input Current from a Transformer]

FIG. 3A is a diagram illustrating waveforms of an input current Iin and output voltage Vin in a state that a power factor is high, in a case that an input current to the primary windings 206a and 206b of the transformer 206 is defined as Iin and an output voltage of the terminal 203c of the diode bridge 203. A waveform diagram shown in part (a) of FIG. 3A shows a current waveform of the input current Iin in which a vertical axis indicates a current value and a horizontal axis indicates a time t, while a waveform diagram shown in part (b) of FIG. 3A shows a voltage waveform of the output voltage Vin in which a vertical axis indicates a voltage value and a horizontal axis indicates a time t. Incidentally, t1 through t6 indicate timings. In part (b) of FIG. 3A, a voltage Vc is a voltage waveform which indicates a voltage of the electrolytic capacitor 207, and a dashed line indicates a voltage in which the voltage Vc of the electrolytic capacitor 207 is divided by a turn ratio of the primary winding 206a and the primary winding 206b. Incidentally, the voltage which is shown by the dashed line is also a voltage at a connection point (a primary connection point) between the primary winding 206a and the primary winding 206b.

As shown in FIG. 3A, at a time (time t1 (t3, t5, ...)) when the voltage of the electrolytic capacitor 207 is divided by the primary winding 206a and the primary winding 206b and the output voltage Vin of the diode bridge 203 exceeds the divided voltage (a divided voltage value), the input current Iin flows. The input current Iin flows until a time (time t2 (t4, t6, ...)) when the output voltage Vin becomes less than the divided voltage value. Paradoxically, until the output voltage Vin reaches the divided voltage value (for example, from time t2 to time t3), the input current Iin is configured not to flow (Iin=0). In this way, at the time when the output voltage Vin of the diode bridge 203 exceeds the voltage of the charging voltage of the electrolytic capacitor 207 which is divided by the primary winding 206a and the primary winding 206b, the input current Iin starts to flow, however, the input current Iin does not flow for a predetermined period of time.

Therefore, in a case that a frequency of a pulse signal which is input to the gate terminal of the FET 208 and switches the FET 208 to an ON state or an OFF state is set to a fixed frequency, a following pulse signal control is performed in order to keep the output voltage Vout of the switching power source 200 constant. That is, when the output voltage Vin from the diode bridge 203 is low, a width of the pulse signal which is input to the gate terminal (a time during the ON state) is widened (lengthened) and the time during the ON state of the FET 208 is extended. On the other hand, when the output voltage Vin from the diode bridge 203 is high, a width of the pulse signal which is input to the gate terminal (a time during the ON state) is narrowed (shortened) and the time during the ON state of the FET 208 is shortened. Therefore, the shape of the current waveform of the input current Iin is a waveform shape such that a height of a peak portion of a sinusoidal wave which includes a period when no current flows at all (a period when the input current Iin=0) is suppressed, as shown in part (a) of FIG. 3A. Incidentally, during the period when no input current Iin does not flow at all, a power supply to a load is performed by flowing a current from the electrolytic capacitor 207 to the primary windings of the transformer 206. Further, an important condition for the current shape of the input current Iin to become a waveform shape which is shown in part (a) of FIG. 3A is that the voltage Vc of the electrolytic capacitor 207 is always higher than the output voltage Vin of the diode bridge 203 as shown in part (b) of FIG. 3A.

On the other hand, FIG. 3B is a diagram illustrating the current waveform of the input current Iin and the voltage waveform of the output voltage Vin in a case that the charging voltage Vc of the electrolytic capacitor 207 is instantaneously lower than the output voltage Vin of the diode bridge 203. A waveform diagram which is shown in part (a) of FIG. 3B shows a current waveform of the input current Iin in which a vertical axis indicates a current value and a horizontal axis indicates a time t, while a waveform diagram which is shown in part (b) of FIG. 3B shows a voltage waveform of an output voltage Vin in which a vertical axis indicates a voltage value and a horizontal axis indicates a time t. Incidentally, t11 through t22 indicate timings.

The waveform diagram which is shown in FIG. 3B differs from the waveform diagram shown in FIG. 3A, in that the voltage around the peak of the output voltage Vin of the diode bridge 203 is higher than the charging voltage Vc of the electrolytic capacitor 207 in FIG. 3B. When the output voltage Vin is higher than the charging voltage Vc of the electrolytic capacitor 207 (during periods from t12 through t13, t16 through t17 and t20 through t21), the input current Iin instantaneously becomes a large current. As a result, as shown in part (a) of FIG. 3B, a waveform shape of the input current Iin is such that a protrusion portion is formed around a peak value, in contrast to the current waveform which is shown in part (a) of FIG. 3A. In the embodiment, to prevent from forming protrusion portions in an input current waveform, the charging voltage Vc of the electrolytic capacitor 207 is set to be always higher than the output voltage Vin of the diode bridge 203. Thus, it is possible for the current waveform of the input current Iin to be the waveform shape such that the peak portion of the sinusoidal wave shape which includes the period when no current flows at all is suppressed.

[Switching Power Source of Capacitor Input Type]

Part (a) of FIG. 4 is a circuit diagram showing a circuit configure of an example of a switching power source of a capacitor input type in which a smoothing capacitor for smoothing an input DC voltage at a rear stage of the diode bridge which rectifies the full wave AC voltage which is input from the AC power source. A switching power source 400 which is shown in part (a) of FIG. 4 is a flyback converter in which winding directions of a primary winding 405a and a secondary winding 405b of a transformer 405 are opposite directions.

In part (a) of FIG. 4, when an AC plug 401 is connected to an outlet, an AC voltage is input to the switching power source 400 from an AC power source (not shown). The AC voltage which is input is input to a diode bridge 403 through a filter circuit 402. The diode bridge 403 which is a rectifier circuit rectifies a full wave AC voltage which is input from input terminals 403a and 403b on an input side and outputs to terminals 403c and 403d on an output side. A DC voltage is output from the diode bridge 403 in which the full wave AC voltage is rectified, and is smoothed to a substantially constant voltage by an electrolytic capacitor 404 and charged.

The transformer 405 is a transformer whose primary and secondary sides are insulated, and includes the primary winding 405a and the secondary winding 405b which is wound in an opposite direction of the primary winding. Further, the primary winding 405a is connected to a positive side of the electrolytic capacitor 404 and the terminal 403c of the diode bridge 403 on an output side on one end, and is connected to a drain terminal of a field effect transistor (hereinafter referred to as a FET) 406 on the other end. Further, a source terminal of the FET 406 is connected to a negative side of the electrolytic capacitor 404 and the terminal 403d on the output side of the diode bridge 403. Further, a gate terminal of the FET 406 is connected to a control IC (not shown), and the FET 406 is set to ON state or OFF state according to a signal which is input to the gate terminal from the control IC. Further, the secondary winding 405b includes a diode 407 and an electrolytic capacitor 408 which are rectifying and smoothing means for rectifying and smoothing a voltage which is induced by the secondary winding 405b. One end of the secondary winding 405b is connected to an anode terminal of the diode 407, and the other end of the secondary winding 405b is connected to a negative side of the electrolytic capacitor 408. Further, a cathode terminal of the diode 407 is connected to a positive side of the electrolytic capacitor 408, and the negative side of the electrolytic capacitor 408 is connected to the other end of the secondary winding 405b and is also grounded.

When the FET 406 is in a conduction state (an ON state) by applying a gate voltage from a control IC (not shown) to a gate terminal of the FET 406, a current is supplied from the electrolytic capacitor 404 and an electric power (energy) is accumulated in the primary winding 405a. And when the gate voltage supply from the control IC to the gate terminal of the FET 406 is blocked and the FET 406 is in a non-conduction state (an OFF state), the electric power (energy) which is accumulated in the primary winding 405a is induced in the secondary winding 405b. The induced voltage is rectified and smoothed by the diode 407 and the electrolytic capacitor 408, and the output voltage Vout is output. Incidentally, a same function is realized by being configured of a field effect transistor (FET) instead of the diode 407, and it is possible to further suppress an electric power loss.

Further, part (b) of FIG. 4 shows a current waveform of an input current of the switching power source 400 which is a flyback converter in part (a) of FIG. 4. In a circuit diagram of part (a) of FIG. 4, the input current from the diode bridge 403 flows only when the charging voltage of the electrolytic capacitor 404 is lower than the output voltage of the diode bridge 403. Therefore, as shown in part (b) of FIG. 4, a waveform of an input current from the diode bridge 403 become a very narrow shape of a conduction angle which is a phase angle in which the input current flows, a power factor in a state that the conduction angle is very narrow is very low, and an amount of a reactive current is large. Incidentally, here, the flyback converter is used as an example of a switching power source of a capacitor input type and is described. For example, even though other type of a power source such as a forward converter and a LLC power source in which winding directions of the primary winding and the secondary winding are same, an input current waveform is similar to an input current waveform which is shown in part (b) of FIG. 4.

[A Composite Current Waveform of Two Switching Power Sources]

Part (a) and part (b) of FIG. 5 show current waveforms of composite currents in which current waveforms of the switching power source 200 in FIG. 2 which are shown in part (a) of FIG. 3A and part (b) of FIG. 3B and current waveform of the switching power source 400 of the capacitor input type in part (a) of FIG. 4 which is shown in part (b) of FIG. 4 are composed. Part (a) of FIG. 5 is the current waveforms of the composite current in which an input current waveform in part (a) of FIG. 3A and an input current waveform of the switching power source 400 of the capacitor input type in part (b) of FIG. 4 are composed. A current waveform which is shown in part (a) of FIG. 5 is added by (composed of) the input current waveform of the switching power source 400 of the capacitor input type which is shown in part (a) of FIG. 4 in such a way that suppressed amount of waveform in which peak portions of a waveform of a sinusoidal wave shape which is shown in part (a) of FIG. 3A are suppressed is supplemented. Thus, a shape of the waveform is similar to waveform shape of a sinusoidal waveform, and it is possible to achieve a high power factor.

On the other hand, part (b) of FIG. 5 is the current waveform of the composite current in which an input current waveform in part (a) of FIG. 3B and an input current waveform of the switching power source 400 of the capacitor input type in part (b) of FIG. 4 are composed. In the current waveform which is shown in part (b) of FIG. 5, a protrusion portion is formed in a waveform of a sinusoidal waveform shape which is shown in part (a) of FIG. 3B, and, furthermore, the input current waveform of the switching power source 400 of the capacitor input type which is shown in part (b) of FIG. 4 is added. Therefore, the current waveform becomes nearly triangular in shape, as shown in part (b) of FIG. 5. So it is difficult to achieve a high power factor.

In a circuit configuration of the switching power source 200 which is shown in FIG. 2, the inductor 204 includes a function to adjust the charging voltage Vc of the electrolytic capacitor 207. For example, when an inductance value of the inductor 204 is reduced, an input current from the diode bridge 203 is increased. As a result, a charging amount of the electrolytic capacitor 207 is increased and the charging voltage Vc is easily increased, then it is possible to be approximated to the input current waveform which is shown in part (a) of FIG. 3A. On the other hand, when the inductance value of the inductor 204 is increased, the input current from the diode bridge 203 is decreased. As a result, a discharging amount of the electrolytic capacitor 207 is increased and the charging voltage Vc is easily decreased, then it is easily to become the input current waveform which is shown in part (a) of FIG. 3B. In this way, the inductance value of the inductor 204 is greatly affected by the input voltage range conditions of the switching power source 200, and also greatly affects a withstand voltage of the electrolytic capacitor 207. Therefore, it is necessary to consider and adjust power source specifications of the switching power source 200 and ratings of components which are used.

[Example of Product Use Pattern]

FIG. 6 is a diagram illustrating a use pattern of a product which is provided with the switching power source which is described above. In FIG. 6, the printer 100 is provided with the low voltage power source device 108 which includes the switching power source 200 in the embodiment which is shown in FIG. 2, as described in FIG. 1. On the other hand, an electronic device 600 is an electronic device which is different from the printer 100 and is provided with the switching power source 400 of the capacitor input type which is shown in FIG. 4 as a switching power source. And the AC plug 201 of the switching power source 200 which is mounted on the printer 100 and the AC plug 401 of the switching power source 400 which is mounted on the electronic device 600 are connected to an outlet 601 which is provided with a wall. As shown in FIG. 6, the switching power source 200 and the switching power source 200 are in a state that they are connected in parallel to a same AC power source (a same AC power source outlet 601). At this time, as described above, the current waveform, which is composed of the input current to the switching power source 200 of the printer 100 and the input current to the switching power source 400 of the electronic device 600, is approximated to a shape of a sinusoidal waveform which is shown in part (a) of FIG. 5, and it is possible to improve the power factor.

As described above, the switching power source 200 in the embodiment includes the circuit configuration which is shown in FIG. 2 and the voltage of the electrolytic capacitor 207 is set higher than the output voltage Vin of the diode bridge 203. As a result, the current waveform of the input current Iin becomes a waveform of the sinusoidal waveform shape such that a height of the peak portion of the sinusoidal waveform is suppressed. As a result, in a case that the printer 100 on which the switching power source 200 is mounted and the electronic device 600 on which the switching power source 400 of the capacitor input type is mounted are connected to a common wall outlet 601, it is possible to increase a power factor of a composed current waveform of both of the devices. Incidentally, in the embodiment, it is described by using an example that the printer 100 and the electronic device 600 are connected the common wall outlet 601, however, a same effect is also achieved in a case that same cable taps are used for example.

Further, the switching power source 200 which is described in FIG. 2 may be designed to support a wide range of input voltages (for example, from 85V to 264V) as a universal power source. At this time, in a case that it is difficult to make entire input voltage range and load current range input current waveforms without any protrusion portions as shown in part (a) of FIG. 3A, a following manner may be done. That is, only an input current near a maximum load at a low input voltage may be a current waveform which includes a protrusion shape as shown in part (b) of FIG. 5. In this case, since the input current near the maximum load is a current which flows instantaneously, when the power factor during this period is dropped, it is considered that it has no trouble. That is, in a case that a voltage which is input to the diode bridge 203 is a first voltage, the inductance value of the inductor 204 is set so that the voltage of the electrolytic capacitor 207 is always higher than the output voltage Vin of the diode bridge 203. At this time, in a case that the input voltage is a second voltage which is lower than the first voltage, the voltage of the electrolytic capacitor 207 may not always higher than the output voltage Vin of the diode bridge 203. In a case the input voltage is the second voltage, according to the external load which is connected to the switching power source 200, it may be configured that periods when the electrolytic capacitor 207 voltage is higher and lower than the output voltage Vin of the diode bridge 203 are occurred.

As described above, according to the embodiment, it is possible to improve the power factor of the switching power source in which the primary side and the secondary side are insulated.

Second Embodiment

In the first embodiment, the switching power source, which includes the circuit configuration which is capable of low voltage output with the high power factor and which sets the charging voltage of the electrolytic capacitor so that it is always higher than the output voltage of the diode bridge and the input current waveform is made to be the shape in which the peak value of the sinusoidal waveform is suppressed, is described. Since the switching power source in the first embodiment is configured of only a basic circuit, there is concern that a surge voltage which is occurred during switching of the switching element may become large depending on the power which is supplied to the load and the switching power source may become noisy. In a second embodiment, a switching power source, in which a circuit which suppresses a noise is added, will be described. Incidentally, the image forming apparatus in which the switching power source in the embodiment is mounted is same as the printer 100 in the first embodiment, and same devices and same members are described by using the same reference numerals and descriptions here are omitted.

[Configuration of Switching Power Source]

FIG. 7 is a circuit diagram showing a circuit configuration of the switching power source 200 in the embodiment. In the circuit diagram which is shown in FIG. 7, compared to the circuit diagram which is shown in FIG. 2 of the first embodiment, it differs in that diodes 701 and 704, a capacitor 702, and an auxiliary winding 703 in the transformer 206 are added. Incidentally, in the switching power source 200 in the embodiment, descriptions here are omitted by using same reference numerals to describe parts with same configurations as the switching power source 200 of the first embodiment which is shown in FIG. 2. Further, in the switching power source 200 in the embodiment, descriptions are omitted with regard to same circuit operations as in the switching power source 200 in the first embodiment.

In FIG. 7, one end of the capacitor 702 (a second capacitor) is connected to the other end of the primary winding 206b of the transformer 206 and the drain terminal of the FET 208, and the other end of the capacitor 702 is connected to an anode terminal of the diode 701. Further, a cathode terminal of the diode 701 (a second rectifier element) is connected to a positive side of the electrolytic capacitor 207 and the other end of the primary winding 206a of the transformer 206. The diode 701 and the capacitor 702 are connected in series and are connected in parallel to the primary windings 206a and 206b of the transformer 206 which are connected in series.

The anode terminal of the diode 704 (a third rectifier element) is connected to the source terminal of the FET 208, the negative side of the electrolytic capacitor 207, and the output terminal of 203d of the diode bridge 203. The cathode terminal of the diode 704 is connected to one end of the auxiliary winding 703 of the transformer 206. The other end of the auxiliary winding 703 of the transformer 206 is connected to a connection point (a second connection point) to which the other end of the capacitor 702 and the anode terminal of the diode 701 are connected. Incidentally, the diode 704 is provided for backflow prevention in order to prevent a charge of the capacitor 702 from discharging through auxiliary winding 703.

In FIG. 7, when the FET 208 is turned off, through the primary winding 206b of transformer 206, a current which flows between the drain terminal and the source terminal of the FET 208 switches to a charging current which charges a capacitance between the drain terminal and the source terminal. As a result, a voltage between the drain terminal and the source terminal of the FET 208 gradually increases due to the charging current. And when the voltage between the drain terminal and the source terminal of the FET 208 exceeds a charging voltage of the electrolytic capacitor 207, a current from the primary winding 206b flows to the electrolytic capacitor 207 through the capacitor 702 and the diode 701. At this time, the voltage between the drain terminal and the source terminal of the FET 208 is suppressed to a predetermined voltage value.

On the other hand, when the FET 208 is turned on, a discharging current which flows from the capacitor 702 is divided into a current which flows through the FET 208 and a current which flows backward through the primary windings 206a and 206b. The current which flows backward through the primary windings 206a and 206b becomes a regenerative current to the electrolytic capacitor 207, and part of energy (a charging voltage of the capacitor 702) which is generated by a surge voltage when the FET 208 turns off is regenerated in electrolytic capacitor 207 and reused. And by flowing the discharging current, the capacitor 702, in which the voltage which is charged by the surge voltage is discharged, becomes a state just before the charge current flows when the FET 208 turns off, and is reset to a state in which it is possible to accumulate the surge voltage (surge energy) again.

On the other hand, the current which flows from the capacitor 702 to the FET 208 flows to the auxiliary winding 703 through the diode 704, and a current energy of the discharging current is accumulated in the auxiliary winding 703. And the energy which is accumulated in the auxiliary winding 703 is converted as the secondary side current when the FET 208 is turned off next time, and is added to the secondary side current in which the energy which is accumulated by the current which flows in the primary windings 206a and 206b is converted. As described above, in the switching power source 200 which is shown in FIG. 7, when the FET 208 turns on and turns off, it is configured that energy is regenerated in the electrolytic capacitor 207. Thus, the switching power source 200 is a highly efficient switching power source by regenerating the energy of the surge voltage while the surge voltage of the FET 208 is suppressed, since the diodes 701 and 704, the capacitor 702, and the auxiliary winding 703 are added.

Further, in the switching power source 200 which includes a circuit configuration which is shown in FIG. 7, it is possible to make an input current waveform a current waveform as shown in part (a) of FIG. 3A by setting the voltage of the electrolytic capacitor 207 to be always larger than the output voltage of the diode bridge 203. In a case that a product on which the switching power source 200 is mounted and an electronic device on which the switching power source of the capacitor input type are connected to a common outlet 601 (FIG. 6), it is possible to approximate a composite current waveform of both devices to a sinusoidal waveform shape and to make the power factor higher.

As described above, according to the embodiment, it is possible to improve the power factor of the switching power source in which the primary side and the secondary side are insulated.

Third Embodiment

In the first embodiment and the second embodiment, the switching power source, which includes the circuit configuration which is capable of low voltage output with the high power factor and which sets the charging voltage of the electrolytic capacitor so that it is always higher than the output voltage of the diode bridge and the input current waveform is made to be the shape in which the peak value of the sinusoidal waveform is suppressed, is described. And, by shaping the waveform of the input current in such a way that the peak value of the sinusoidal waveform is suppressed, it is possible to improve the power factor in the composite waveform of the input current with another electronic device 600 on which the switching power source of the capacitor input type is mounted. In a third embodiment, an image forming system with a configuration, in which a switching power source of a capacitor input type is mounted as a main power source and a switching power source of a high power factor which is described in the first embodiment and the second embodiment is mounted as a sub-power source, will be described.

[Configuration of Image Forming System]

FIG. 8 is a diagram showing a configuration of an image forming system while all optional devices are mounted. In FIG. 8, an image forming apparatus 800 shows the smallest configuration to perform an image forming operation, and the image forming apparatus 800 by itself is able to print a sheet P based on an image data which is received according to a print request which is sent from a computer (not shown), etc. Incidentally, the image forming apparatus 800 is same as the printer 100 which is shown in FIG. 1 of the first embodiment, and a description of the image forming operation will be omitted.

An image scanner 802, an input option device 803, and an output option device 804 are mounted on the image forming apparatus 800 which is shown in FIG. 8. The image scanner 802 is an image reading device which reads a document which is placed on a glass table and a copy function is realized by printing the read image on a sheet P The input option device 803 is possible to accommodate a large number of sheets P, and is possible to accommodate a large number of sheets P of various sizes so as to correspond to a designation of the sheet P at a time of printing. The output option device 804 includes a plurality of sorter bins 804*a*, 804*b* and 804*c* and is an optional device which includes a sorting function which sorts and outputs the sheets P which are printed. Incidentally, it is not limited to an output option device which includes a sorting function, however, it may also be an optional processing device which processes the sheets P such as an output option device which includes a stapling function for the plurality of sheets P in which images are formed.

Further, in the image forming system which is shown in FIG. 8, a switching power source 801 (corresponding to the low voltage power source device 108 in FIG. 1) which is a low voltage power source device is mounted on the image forming apparatus 800, and a switching power source 805 which is a low voltage power source device is mounted on the output option device 804. And in the image forming system of FIG. 8, the switching power source 801 (a first power source device) is configured as a main power source and the switching power source 805 (a second power source device) is configured as a sub-power source. For example, when a single switching power source 801 is configured to be able to supply power to all optional devices, in a case of the image forming apparatus 800 alone in which no optional devices are mounted at all, power supply capability from the switching power source 801 become in an excessive state. As a result, costs of the switching power source 801 become no longer optimal. Therefore, in a case that a plurality of optional devices are mounted as shown in FIG. 8, it is more likely to reduce overall costs when it is configured with two switching power sources 801 and 805. In the embodiment, the switching power source 801 is a switching power source of a capacitor input type, and the switching power source 805 is configured to be the switching power source of the high power factor type which is described in the first embodiment and the second embodiment and is configured so that AC voltage is supplied from a common AC power source. Thus, a current waveform which is composed of current waveforms of each input current of the switching power sources 801 and 805 become a shape of a substantially sinusoidal waveform as shown in FIG. 3A which is described in the first embodiment, and it is possible to achieve a high power factor.

As described above, the image forming system in the embodiment mounts all optional devices and is configured that two switching power sources of the main power source and the sub-power source are mounted as power sources. One of the two switching power sources is a conventional switching power source of a capacitor input type, and the other is a switching power source of a high power factor type which is described in the first embodiment and the second embodiment. By a configuration of the power source device, it is possible to approximate the composite waveform of the input current of each switching power source to a sinusoidal wave and to improve the power factor. Incidentally, in the embodiment, the switching power source 805 which is mounted on the output option device 804 is a switching power source of a high power factor type and performs power supply to the output option device 804. On the other hand, it is configured that the switching power source 801 of the capacitor input type which is mounted on the image forming apparatus 800 performs the power supply of the image scanner 802 and the input option device 803 in addition to the image forming apparatus. Incidentally, it is possible to achieve a similar effect even when it is configured that, for example, the switching power source of the high power factor type which supplies power to the input option device 803 is mounted on the input option device 803, and the switching power source 801 and two switching power sources of the high power factor type perform power supply.

As described above, according to the embodiment, it is possible to improve the power factor of the switching power source in which the primary side and the secondary side are insulated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-179726, filed on Nov. 2, 2021, which is hereby incorporated by reference herein in its entirety.

What is claimed is:

1. A power source device comprising:
   a transformer including a first primary winding and a second primary winding, and a secondary winding, and of which a primary side and a secondary side are insulated from each other;
   a rectifying circuit including a first output terminal and a second output terminal, the rectifying circuit being configured to fully rectify an AC voltage;
   a first series circuit in which an inductor and a first rectifying element are connected in series, the first series circuit being connected between the first output terminal and a first connecting point where one end of the first primary winding and one end of the second primary terminal are connected;
   a switching element connected between the other end of the second primary winding and the second output terminal, the switching element being configured to be switched between an on state and an off state; and
   a first capacitor connected between the other end of the first primary winding and the second output terminal,
   wherein an inductance of the inductor is set so that a voltage of the first capacitor is higher than an output voltage of the rectifying circuit, and a number of turns of the first primary winding is greater than the number of turns of the second primary winding,
   wherein, in a case in which a voltage input to the rectifying circuit is a first voltage, the voltage of the first capacitor always becomes higher than a peak of the output voltage of the rectifying circuit, and
   wherein, in a case in which the voltage input to the rectifying circuit is a second voltage that is lower than the first voltage, the inductance of the inductor is set so as to generate a period where the voltage of the first capacitor is higher than the output voltage of the rectifying circuit and a period where the voltage of the first capacitor is lower in accordance with an external load connected to the power source device.

2. The power source device according to claim 1, wherein the larger the number of turns of the first primary winding than the number of turns of the second primary winding becomes, the lower the voltage of the first capacitor becomes when a current flows through the first series circuit.

3. The power source device according to claim 1, wherein the lower the inductance of the inductor becomes, the larger the current flowing through the first series circuit becomes.

4. The power source device according to claim 3, wherein the first rectifying element is a first diode, the inductor is connected between the first output terminal and an anode terminal of the first diode, and a cathode terminal of the first diode is connected to the first connecting point.

5. The power source device according to claim 4, wherein the transformer includes an auxiliary winding, and
wherein the power source device further comprises:
a second series circuit in which a second capacitor and a second rectifying element are connected in series, the second series circuit being connected between the other end of the first primary winding and the other end of the second primary winding, and
a third series circuit in which a third rectifying element and the auxiliary winding are connected in series, the third series circuit being connected between the other end of the switching element and a second connecting point where the second capacitor and the second rectifying element are connected.

6. The power source device according to claim 5, wherein the second rectifying element is a second diode,
wherein one end of the second capacitor is connected to the other end of the second primary winding and to one end of the switching element, and the other end is connected to an anode terminal of the second diode, and
wherein a cathode terminal of the second diode is connected to the other end of the first primary winding and to the one end of the first capacitor.

7. The power source device according to claim 6, wherein the third rectifying element is a third diode,
wherein an anode terminal of the third diode is connected to the other end of the switching element and a cathode terminal is connected to one end of the auxiliary winding, and
wherein the other end of the auxiliary winding is connected to the second connecting point.

8. The power source device according to claim 7, wherein when the switching element is turned off, a current flowing through the second primary winding flows into the second series circuit, and a surge voltage is suppressed by the second capacitor.

9. The power source device according to claim 8, wherein, when the switching element is turned on, a current from the second capacitor flows through the auxiliary winding of the third series circuit via the switching element.

10. The power source device according to claim 9, wherein the switching element is a field effect transistor, and
wherein the one end of the switching element is a drain terminal of the field effect transistor, and the other end of the switching element is a source terminal of the field effect transistor.

11. An image forming apparatus comprising:
an image forming portion configured to form an image on a recording material; and
a power source device configured to supply power to the image forming portion,
wherein the power source device includes:
a transformer including a first primary winding and a second primary winding, and a secondary winding, and of which a primary side and a secondary side are insulated from each other;
a rectifying circuit including a first output terminal and a second output terminal, the rectifying circuit being configured to fully rectify an AC voltage;
a first series circuit in which an inductor and a first rectifying element are connected in series, the first series circuit being connected between the first output terminal and a first connecting point where one end of the first primary winding and one end of the second primary terminal are connected;
a switching element connected between the other end of the second primary winding and the second output terminal, the switching element being configured to be switched between an on state and an off state; and
a first capacitor connected between the other end of the first primary winding and the second output terminal,
wherein an inductance of the inductor is set so that a voltage of the first capacitor is higher than an output voltage of the rectifying circuit, and a number of turns of the first primary winding is greater than the number of turns of the second primary winding,
wherein, in a case in which a voltage input to the rectifying circuit is a first voltage, the voltage of the first capacitor always becomes higher than a peak of the output voltage of the rectifying circuit, and
wherein, in a case in which the voltage input to the rectifying circuit is a second voltage that is lower than the first voltage, the inductance of the inductor is set so as to generate a period where the voltage of the first capacitor is higher than the output voltage of the rectifying circuit and a period where the voltage of the first capacitor is lower in accordance with an external load connected to the power source device.

12. The image forming apparatus according to claim 11, wherein the transformer includes an auxiliary winding, and
wherein the power source device further includes:
a second series circuit in which a second capacitor and a second rectifying element are connected in series, the second series circuit being connected between the other end of the first primary winding and the other end of the second primary winding, and
a third series circuit in which a third rectifying element the auxiliary winding are connected in series, the third series circuit being connected between the other end of the switching element and a second connecting point where the second capacitor and the second rectifying element are connected.

* * * * *